United States Patent
Desilets

(10) Patent No.: US 11,175,068 B1
(45) Date of Patent: Nov. 16, 2021

(54) AIR CONDITIONING DRAIN LINE SYSTEM

(71) Applicant: Brian Desilets, Simpsonville, KY (US)

(72) Inventor: Brian Desilets, Simpsonville, KY (US)

( * ) Notice: Subject to any disclaimer, the term of this patent is extended or adjusted under 35 U.S.C. 154(b) by 160 days.

(21) Appl. No.: 16/398,590

(22) Filed: Apr. 30, 2019

Related U.S. Application Data

(63) Continuation-in-part of application No. 15/883,906, filed on Jan. 30, 2018, now Pat. No. 10,895,422.

(51) Int. Cl.
 *F24F 13/22* (2006.01)
 *C02F 1/68* (2006.01)
 *C02F 1/76* (2006.01)

(52) U.S. Cl.
 CPC ............ *F24F 13/222* (2013.01); *C02F 1/688* (2013.01); *C02F 1/76* (2013.01); *F24F 2013/227* (2013.01); *F24F 2013/228* (2013.01)

(58) Field of Classification Search
 CPC ..... C02F 1/688; F24F 13/22; F24F 2013/227; F24F 2013/228
 See application file for complete search history.

(56) References Cited

U.S. PATENT DOCUMENTS

| | | | |
|---|---|---|---|
| 3,754,741 A | 8/1973 | Whitehurst | |
| 3,872,521 A * | 3/1975 | Friedman | ................. E03C 1/302 4/255.01 |
| 4,796,926 A * | 1/1989 | Rapsilver | ................. E03F 1/008 141/311 R |
| 5,402,813 A | 4/1995 | Keen | |
| 5,722,458 A | 5/1998 | Potter | |
| 6,182,677 B1 | 2/2001 | Pignataro | |
| 6,248,234 B1 | 6/2001 | Cline | |
| 6,651,690 B1 | 11/2003 | Coogle | |
| 6,676,842 B2 | 1/2004 | Scuilla et al. | |
| 6,927,199 B2 | 8/2005 | Takemura et al. | |
| 6,948,510 B2 | 9/2005 | King | |
| 7,073,732 B2 | 7/2006 | Abbas et al. | |
| 7,389,651 B2 | 6/2008 | Cantolino | |
| 7,670,551 B2 | 3/2010 | Kadlec et al. | |
| 7,713,501 B2 | 5/2010 | Priegel | |
| 7,740,025 B2 | 5/2010 | Scaringe | |
| 8,075,769 B1 | 12/2011 | Gleason et al. | |
| 8,479,760 B2 | 7/2013 | Eads | |
| 9,212,475 B2 | 12/2015 | Chabala | |

(Continued)

OTHER PUBLICATIONS

Munroe "How to Keep Algae From Growing in an Air Conditioner Condensation Line" SFGate. Retrieved Nov. 15, 2017.

(Continued)

*Primary Examiner* — Elizabeth J Martin

(74) *Attorney, Agent, or Firm* — Middleton Reutlinger

(57) ABSTRACT

An air conditioning drain line system is disclosed where the drain line includes an access connector pipe for inserting a chemical delivery strand of material into the drain pipes. The connector pipe may be a Y-shaped connector pipe and retain the strand. The strand may extend into the drain pipes and around an elbow in the pipes. The elbow may be designed to receive standard drain pipes into receiving inlets and create a smooth flow channel through the pipe without any elevational differences between the inner diameter of the elbow at the junction point of the elbow and the received pipes and the inner diameter of the received pipes.

18 Claims, 10 Drawing Sheets

(56) References Cited

U.S. PATENT DOCUMENTS

2003/0111428 A1* 6/2003 Scuilla ............... E03C 1/126
 210/764
2006/0096307 A1 5/2006 Coogle
2016/0377317 A1* 12/2016 Yang ............... F16L 37/04
 62/291

OTHER PUBLICATIONS

"Air Conditioner Pan Tablets (6-Pack)" www.homedepot.com. Retrieved Nov. 15, 2017.

* cited by examiner

AIR CONDITIONING DRAIN LINE SYSTEM

BACKGROUND

Condensation from air conditioners can cause issues in drain lines and maintaining such drain lines free from bacterial or other growth and preventing clogging is important to prevent pipes from backing up and flooding indoor HVAC areas. Air Conditioning units are frequently attached to a standard drain line to feed moisture condensation away from the unit which develops during air cooling operation, particularly in humid conditions. Maintaining such drain lines free from growth and unclogged therefor is important to prevent water and other condensate material from backing up into the HVAC unit and or into a collection reservoir. Typically such systems to prevent or inhibit growth in an HVAC drain line include inefficient pump systems which require electrical connections to be wired to a dispenser which also necessitates separate installation professions. Drain line systems which remove the condensation from air conditioner systems and HVAC systems commonly include corners or turns where the drain line must be redirected.

SUMMARY

This specification is directed generally to apparatus and methods for delivering a chemical into the drain line for a standard air conditioning system and particularly without the necessity of using electrical power for delivery. Providing such a chemical to prevent drain line obstruction in an inexpensive, direct and non-mechanical manner provides benefits which achieve such objective. Inclusive in the disclosure herein sets forth a chemical delivery system which may be readily included into a standard drain system for air conditioning systems and which is also easily accessible as the consumable materials within the apparatus require replacement. For example, some implementations enable an entry type pipe modification which receives a secured replaceable lid, the removable top retaining a depending into the drain line of the air conditioning unit. In such implementations, the lid may retain a strand or filament of material onto which a chemical delivery system may be included. In such implementations, the strand or string of material retains a plurality of the chemical delivery pods or tables can opportunistically deliver a chemical agent in the AC unit drain system as during the time that condensation is traveling through the drainage pipes connected to the AC.

Other aspects disclosed herein relate to providing an AC drain line system which has drain lines having an elbow wherein the elbow allows for the drainage pipes to be redirected. These elbows receive the related drain pipes and provide a smooth flow channel where the juncture of the drain pipe and the elbow meet. More specifically, the joinder portion between the drain pipe and the receiving inlet in which it is received by the elbow have substantially matching inner diameters in order to prevent pooling of water and also allow a chemical delivery strand to pass thereby without snagging or being prevented from further insertion within the drain line.

Some implementations are directed towards a chemical delivery system wherein the lid or other closure which attaches to the drainage pipes may be easily replaced on a regular basis without the requirement of disassembly of drain pipes or of other enclosures in the drainage system. Such implementations may include a lid which has a depending strand and which is removably attached to a drain pipe opening. The removable lid may restrain a separate retention disc which is adhered to the strand the strand depending from the disc into the drainage system and containing at least one chemical delivery systems. The lid may, in various implementations, be locked into position on the entry pipe by a removable locking mechanism.

In various implementations, the apparatus, system and method described herein allows for the continuous and regular delivery of a chemical into the draining system of an air conditioning unit while the draining system is receiving condensate or other moisture. As described herein, the moisture or other condensate travels through the drainage pipes which contain the chemical delivery system disclosed. As the moisture travels through the drainage system and passes over the at least one table or other delivery module, chemicals may be released into the stream of condensate which prevents or inhibits the growth of algae, bacteria or other biological growth which may impede the flow of the condensate.

In further implementations described herein, the retention disc or other holding device of the strand of material may be readily replaced by opening the lid and removing the disc which is attached to the strand extending into the drainage system. The strand may contain depleted chemical delivery tablets or other apparatus, the entirety of which may be replaced through inserting a new disc in between the lid and the opening of the modified drainage pipe.

Aspects of the chemical delivery system disclosed herein include a chemical delivery system for an air conditioning unit drainage line, including a retention disc having a flat annular surface and which is sized to be received with in a closure, the retention disc having a central area disposed between the flat annular surface, the central area affixed to a strand of material Additionally, the strand of material may have a plurality of chemical delivery tablets, each of the chemical delivery tablets affixed to the strand of material to prevent translation along the strand of material. Further, the system may include a closure or lid having an annular top wall and depending side wall, the retention disc received within the depending side wall. The strand of material may be provided such that it extends away from the lid and the retention disc to which it is secured.

These and other implementations may include on or more of the following features.

The chemical delivery system described herein may include the strand of material which has a plurality of securing tabs, each of the securing tabs positioned adjacent to a respective chemical delivery tablet. Alternatively, or in addition thereto, the chemical delivery system may include a strand of material which has a plurality of baskets, each of the plurality of baskets affixed to the strand of material and receiving a respective one of the chemical delivery tablets.

In variations, the strand of material may be affixed to a retention disc by an adhesive or other sonic welding. Alternatively, the strand of material may be mechanically affixed to the retention disc. In implementations, the retention disc may have an aperture wherein the strand of material is retained on the retention disc by the strand extending through the aperture.

In some implementations, the lid/closure has at least one helical thread on an interior surface of the depending side wall. Alternatively or in addition thereto the lid may have at least one inbound lug formed on an interior surface of the depending side wall.

In some aspects and disclosure hereof, the chemical delivery tablets may be bonded to the strand of material and extend along the length thereof.

In some implementations, the chemical delivery strand of material may be combined with a Y-shaped connector, the Y-shaped connector having a first entry aperture, a second entry aperture and an output aperture, wherein the first entry aperture receives the chemical strand of material. In other implementations, the closure/lid may be removably connected to the first entry aperture, the retention disc interposed between the lid and a surface of the first entry aperture.

In implementations described herein, a chemical delivery system is disclosed which includes a strand of material having a plurality of spaced chemical delivery tablets, the chemical delivery tablets secured to the strand. As well, the system may include a removable lid which retains the strand of material having the plurality of spaced chemical delivery tables within a drain pipe. Further, the system may allow the closure/lid to be removably affixable to the drain pipe opening such that when installed on the drain pipe opening, the strand of material having the plurality of spaced chemical delivery tables is inserted into and maintains position in the drain pipe and extends downward into the pipe.

These and other implementations may include on or more of the following features.

In aspects, the removable lid positions a retention disc in between an opening of the drain pipe and the lid, the retention disc secured to the strand of material having the plurality of spaced chemical delivery tablets. Alternatively or in addition thereto, the chemical delivery strand described herein may include a plurality of securing tabs to assist in maintaining position for each of the plurality of spaced chemical delivery tablets on the strand of material.

In embodiments, the strand of material may include a matching plurality of securing baskets for the plurality of spaced chemical delivery tablets, each of the securing baskets allowing fluid to flow through the basket and holding the respective chemical delivery tablet.

As well or in addition thereto, as described herein, the strand of material may include a matching plurality of securing baskets for the plurality of spaced chemical delivery tablets, wherein the basket retains the respective tablet and wherein the tablet is a plurality of small tablets.

In embodiments, the plurality of small tablets may be granular tablets. As well, in some aspects, the at least one of the spaced chemical delivery tablets may be a chlorine tablet.

In still further embodiments, described herein is a method of delivering a chemical sanitizer into a drain opening, including securing a plurality of chemical delivery tablets to a strand of material, securing the strand of material to a retention disc, inserting the strand of material having the plurality of chemical delivery tablets into the drain opening; wherein the strand of material having the plurality of chemical delivery tablets, after being inserted into the drain opening, extends down into the opening and into a drain pipe; and removably retaining the retention disc at the opening.

Aspects and features of such implementation may include delivering a chemical sanitizer into a drain opening wherein the retention disc is removably retained at the opening by a removable closure.

In addition, portions of this disclosure are directed towards a chemical delivery system for an air conditioning unit drainage line, including a retention disc having a flat annular surface, the retention disc having a central area disposed between the flat annular surface; a rotational tab on a top surface of the retention disc; a flexible chemical delivery strand of material extending from the retention disc; wherein the chemical delivery strand supports a plurality of chemical delivery tablets, each of the chemical delivery tablets prevented from translation along the chemical delivery strand. Further, the strand of material may include a fixture at the end of the chemical delivery strand of material to aid in negotiating insertion of the flexible chemical delivery strand into a drainage pipe.

Aspects and features of such implementation may include a retention disc having a flat annular surface surrounds the rotational tab. Further aspects may include a retention disc wherein the retention disc flat annular surface and the central area are on a different elevational plane. In addition or in place thereof, the fixture at the end of the chemical delivery strand of material is a ball type formation or other type of fixture and/or shape. Further, in aspects, the fixture may extend outward and away at a predefined angle from an elbow formed in the strand of material.

In other implementations, aspects disclosed herein include a drain line system including an AC drain line exiting an air handling unit, the drain line having at least one elbow, a connector pipe in the AC drain line retaining a chemical delivery strand, the chemical delivery strand extending along at least a portion of the AC drain line, the elbow having a pipe receiving inlet and a pipe receiving outlet. In some implementations, the pipe receiving inlet has a first annular recessed edge and the pipe receiving outlet having a second annular recessed edge. The system also includes a first drain pipe extending into the pipe receiving inlet and a second drain pipe extending into the pipe receiving outlet wherein the first drain pipe abuts the first annular recessed edge and the second drain pipe abuts the second annular recessed edge. Further, an inner diameter of the first drain pipe substantially matches an inner diameter of the first annular recessed edge, and wherein an inner diameter of the second drain pipe substantially matches an inner diameter of the second annular recessed edge.

These and other implementations may include on or more of the following features.

In some implementations, the system may include a chemical delivery strand which has a plurality of chemical delivery tablets. In some systems, the strand may be retained in the AC line by a connector pipe that is Y-shaped. In other examples, the strand may be a flexible strand of material that extends past the elbow from the connector pipe.

In other implementations, the system may utilized an AC drain line elbow that has a bend of between about 40 degrees up to and more than about 95 degrees. In additional implementations, the elbow may be a two piece elbow that is assembled or joined together to form the entire elbow. In others, the two piece elbow may be an upper half and a lower half each of which extend the entire length of the elbow. In other implementations, the drain line system elbow may form a substantially smooth flow channel where it is attached to the first drain pipe and the second drain pipe, both of which are attached to the elbow.

In other aspects, the elbow may have a first inner layer of material and a second outer layer of material. In some examples, the second out layer of material may be a molded material that is an insulation based thermoplastic that provides insulating properties.

Further aspects of the drain line system include a drain line including an elbow, a chemical delivery strand extending along at least a portion of the drain line and along at least a portion of the elbow, the elbow having a pipe receiving inlet and a pipe receiving outlet, the pipe receiving inlet having a first annular edge and the pipe receiving outlet having a second annular edge. The system further has a first drain pipe extending into the pipe receiving inlet and a second drain pipe extending into the pipe receiving outlet wherein the first drain pipe abuts the first annular edge and the second drain pipe abuts the second annular edge. An inner diameter of the first drain pipe substantially matches an inner diameter of the first annular edge and the inner diameter of the second drain pipe substantially matches an inner diameter of the second annular edge.

These and other implementations may include on or more of the following features.

In some implementations, the chemical delivery strand is retained at a connector pipe in the drain line, the connector pipe having an entry pipe retaining the chemical delivery strand. In yet other examples, the elbow has a first inner layer and a second outer layer of injection molded material, wherein the second outer layer of molded material may optionally be a thermal insulator.

In some examples, the first drain pipe, the elbow and the second drain pipe form a substantially smooth flow channel allowing fluid to drain without obstruction within the flow channel. In still other implementations, the chemical delivery strand may be flexible.

Still further examples of a drain line system for an air conditioning unit drainage line is disclosed herein, which includes an AC drain line including a first drain pipe, a second drain pipe and an elbow, a chemical delivery strand entering the AC drain line at a pipe entry location and extending along at least a portion of the AC drain line and along at least a portion of the elbow, the elbow having a pipe receiving inlet and a pipe receiving outlet, the pipe receiving inlet having a first annular edge and the pipe receiving outlet having a second annular edge. The system also includes a first drain pipe of the AC drain line extending into the pipe receiving inlet and a second drain pipe of the AC drain line extending into the pipe receiving outlet, wherein the first drain pipe abuts the first annular edge of the elbow and the second drain pipe abuts the second annular edge of the elbow. Further, the inner diameter of the first drain pipe and the inner diameter of the second drain pipe substantially matches an inner diameter of a flow through channel at least at an area directly adjacent to the joinder of both the first drain pipe and the first annular edge and the second drain pipe and the second annular edge.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
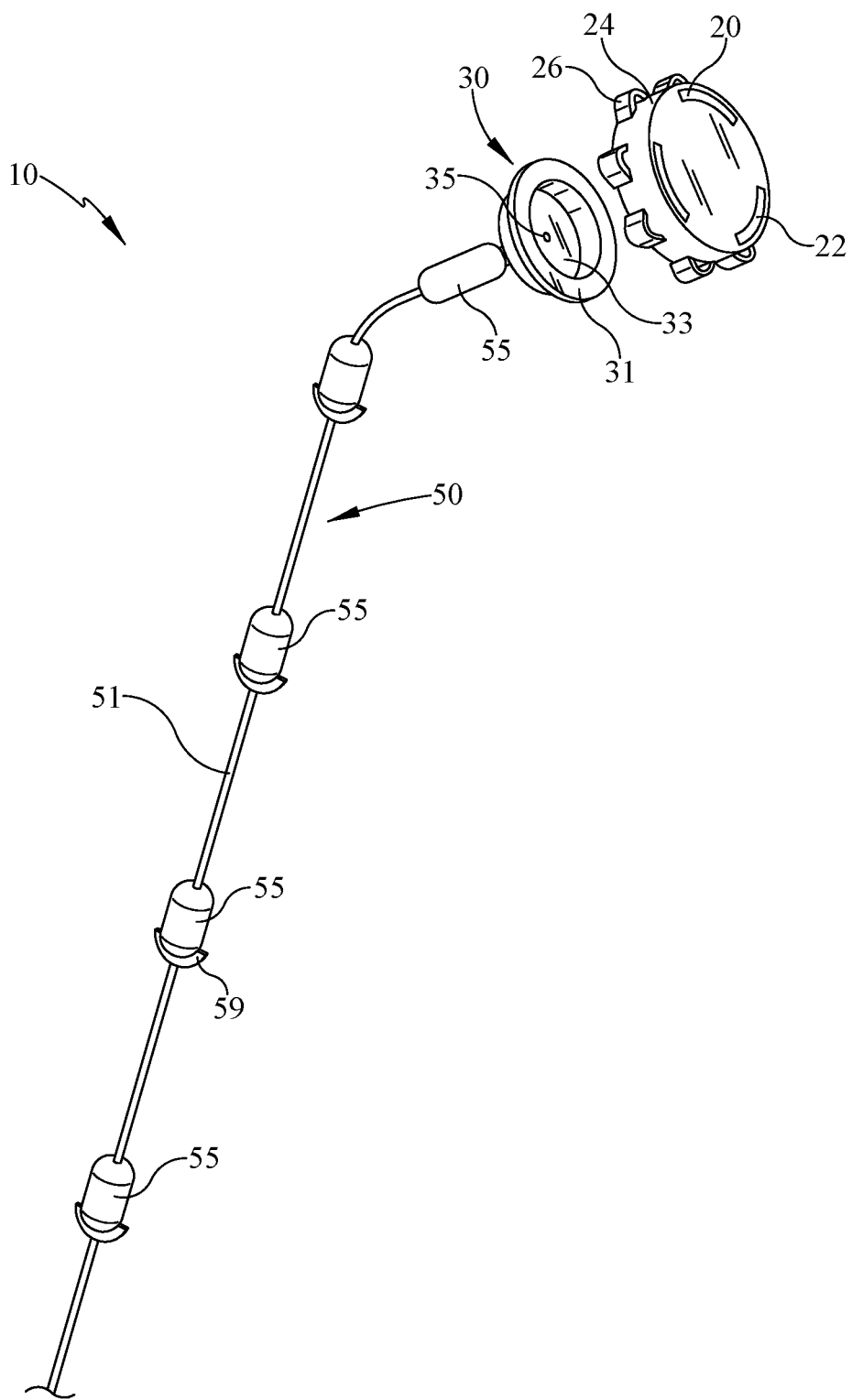
FIG. 1 illustrates an example of a chemical delivery system in which a strand of material is depicted with a cap and retention disc for insertion into a drainage pipe.

Some implementations of the technology described herein are directed to installing a removable and replaceable strand of material into a drainage line in order to prevent algae or other growth in the drainage line due to the presence of water or other condensate.

In some of those implementations, chemical delivery system may be utilized to slowly, directly and measurably deliver an anti-growth chemical into a drainage conduit. The delivery system may be slowly consumed by the fluid in the drain pipe and may also be periodically replaced as needed without the requirement of pipe or conduit disassembly. Variations are included herein whereby the chemical material is held in place on the strand of material depending into the drainage pipe by variant mechanisms. The strand of material may be easily removed and replaced with a new strand of material. Regular replacement can ensure that bacterial or other growth is inhibited within the drainage pipe.

With reference to FIGS. 1-12, various implementations of a chemical delivery system to inhibit the growth of algae, eukaryote, bacteria or other growth organisms which can clog a drainage pipe are disclosed. The chemical delivery system 10 disclosed in the various embodiments include a strand or line of material 51 which may be removably inserted and retained within a drainage pipe in a position such that as condensate or other fluid from, for example an air conditioning unit condensate drain, passes by, the delivery system disclosed herein slowly and measurably delivers an anti-growth chemical. In implementations, the strand of material may be inserted into the drain pipe through the use of a Y-connect entry pipe which may be interposed into the drain line of an HVAC unit. Regular replacement of the strand of material containing the chemical delivery material can prevent buildup of clogging growth organisms.

In variations, the chemical delivery system 10 may include portions of the retention disc and chemical delivery strand of material 50 with associated chemical delivery tablets. Such implementations may incorporate features of the baskets, securing tabs or other features alone or in combination. Further, such implementations may include multiple mechanisms for securing the strand 51 to the retention disc 30. However, such delivery system, in implementations, does not necessarily require the cap/closure 20 and/or may include combinations of the cap/closure 20 and retention disc structures and features thereof.

As is disclosed in the embodiment of FIG. 1, a chemical delivery system 10 is displayed wherein a chemical delivery strand 50 extends down from an optional retention disc 30. The chemical delivery strand 50 may include, in implementations, a plurality of spaced chemical tablets 55 or other chemical delivery structures. The strand or line of material 51 may be adhered to the bottom surface of the retention disc 30 and, once installed, extends down into the drainage pipe of an HVAC unit wherein condensation, fluid or other moisture collected from the HVAC unit is allowed to drain. The line or strand of material may, in embodiments, be variations of plastic, thermoplastic or other non-decaying or moisture resistant material.

For example, in various implementations the line or strand of material 51 may be made of nylon, polyvinylidene fluoride (PVDF), polyethylene, Dacron or other monofilament or multi-filament material.

Periodically spaced along the line of material 51 may be a chemical tablet 55 or other delivery system. The chemical tablet may be, in variations, a solid tablet of chlorine or other growth inhibiting chemical which measurably delivers constituent chemical as water or other fluid passes over the tablet. For example, alternatively or in addition thereto, the chemical tablet 55 may be a hardened reagent tablet that slowly and measurably dissolves as fluid passes thereby. In implementations, the tablet may be a formed tablet which is formed around the strand 50 of material and which is thereby attached thereto. In other implementations, the chemical tablet 55 may have a central aperture and be strung onto the line 51.

Figure 2:
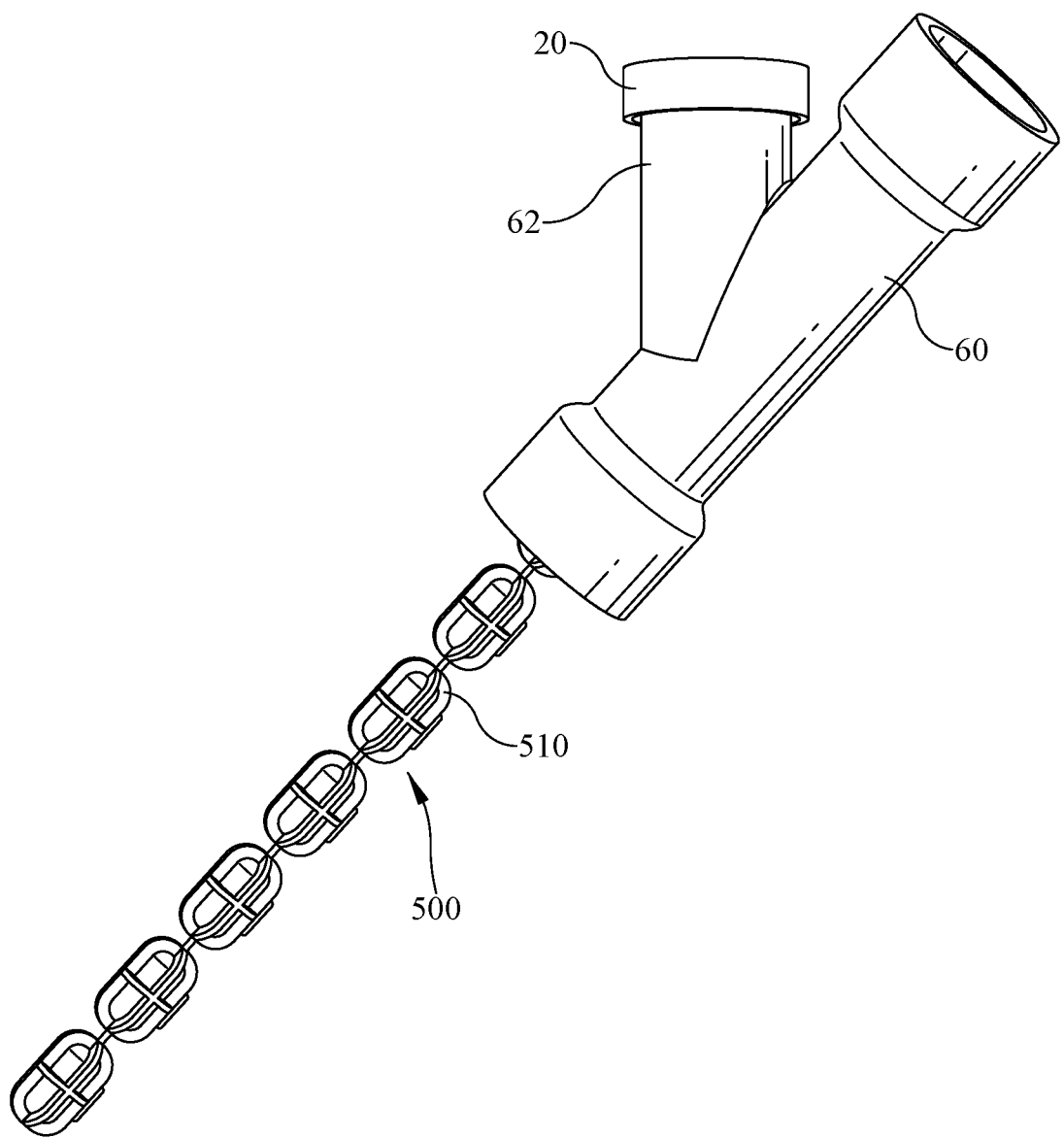
FIG. 2 illustrates the chemical delivery system inserted into a drainage pipe and extending down into the pipe from the illustrated example of FIG. 1, and a secondary example of chemical holding and retention structure.

In implementations, a securing tab or nodule 59 may be periodically secured to the line 51 and prevent an adjacent chemical tablet from further sliding down the line. alternatively or in addition thereto, a plurality of baskets 510, as shown in FIG. 2, may be utilized to positionally retain the chemical delivery material on the line 51 extending down into the drain pipe. In such modifications, the baskets 510, in the delivery strand 50D, may have a flow the rough aperture or apertures allowing the fluid in the pipe to directly contact the chemical delivery material contained therein. In implementations, the chemical delivery material may be a hardened tablet or may be small tablets or granules such that slow dissolution of the chemical may be delivered into the drainage pipe as a fluid passes over and through the baskets 510.

In variations, baskets 510 may include a plurality of apertures and may be separately openable so that different chemical delivery materials may be utilized in different baskets. Baskets 510 may also engage the strand 51 once closed by compression or contact in order to maintain their vertical position on the strand once inserted and depending into drainage pipe.

In implementations and in the various embodiments disclosed herein, the tablets may be secured to the strand of material, may be retained in structures affixed to the strand or may abut additional structures on the strand which thereby prevent or restrict translational movement of the tablets along the strand of material. As a result, spacing of the tablets along the strand of material may be maintained as deemed necessary or as optionally implemented in the embodiments. Such implementations and structures for restriction of translational movement may be in addition to, in replacement of or not included within the variations.

In implementations, the chemical delivery tablets may be a form of a chemical reagent that dissolves in the presence of the fluid in the drainage pipe. For example, the chemical delivery tablet may be chlorine. In implementations, the chlorine tablets provide a relatively slow delivery of growth-inhibiting material in to the water or other fluid passing through the drainage pipe. Alternatively, or in addition thereto, bromide or other growth inhibiting material may be utilized for the tablets and or delivery material. In variations, it is desirable to include a material which slowly dissolves in the presence of the drainage fluid, for example condensate from an air conditioning unit, so that a measurable quantity of growth preventative material is deposited into the fluid stream thereby preventing, inhibiting or reducing the growth of such material.

As depicted in the variation of FIG. 1, the chemical delivery strand of material 50 may be attached, affixed or otherwise restrained by a retention disc 30. The retention disc 30 may include a central aperture 35 to hold the line of material 51. Alternatively the line of material 51 may adhered or otherwise affixed to a lower surface of the retention disc central surface 33. Extending around a periphery of the retention disc 30 may be an annular surface 31 which mates against an exposed annular entry aperture surface of the entry pipe 62 for the Y-shaped connector pipe 60. Thus, by securely affixing the chemical delivery strand with the tablets 55 to the retention disc 30, the strand 50 may be fed into the drainage pipe via entry pipe 62 and the plurality of tablets may extend into the main drainage line of the HVAC system, for example. The annular surface 33 may, in implementations, be wider than the entry aperture for entry pipe 62 so that it is supported thereon.

In implementations, the peripheral annular surface 31 and central annular surface 33 may be on the same plane or may be in a stepped differential plane as depicted.

In the implementations of FIGS. 1 and 2, once the retention disc is inserted into the entry pipe 62 of FIG. 2, a cap or other closure 20 may be provided securely restrain the retention disc in place and thereby maintain the position of the chemical delivery tablets 55 down within the drainage pipe. The tablets 55 may be evenly spaced on the line 51 or may be more concentrated in particular locations as needed by the application. The retention disc 30, when used in one embodiment, may be directly affixed to the chemical delivery strand of material 50 and may be entirely replaced on a periodic basis by removal of the lid or closure 20 from the aperture of the entry pipe 62. Thus, the closure 20 may be reused and the retention disc 30 may be replaceable with the chemical delivery strand 50.

Alternatively, in variations, the line of material 51 may be directly adhered to a lower surface of the cap 20 and may or may not rotate with the cap as it is put into place on the entry aperture of the entry pipe 62. Strand of material 51 can be affixed to a disc that is retained on the underside of the cap or closure 20 and may be fixed thereto or may be rotatable within the closure and cooperating structures of the closure.

In some versions of these implementations, the strand of material may be separate from the material of the retention disc and/or the closure 20. Alternatively, the strand of material 51 may made of the same material or integrated with the closure 20, retention disc 30 or in variations thereof. For example, the strand of material may be integrated with the disc 30 so that the disc 30 and the strand 50 with the tablets is removed concurrently as an integrated unit. Alternatively, the strand of material may be integrated only with the closure and may be removed and or replaced with the closure or with a component thereof. For example, the strand of material may be integrated with a rotatable disc which resides in the interior of the closure/cap 20.

The closure/cap may be snap fitted onto and over the entry aperture of the entry pipe 62 through known techniques such as mating inbound lugs formed on the interior side wall of the closure 20 which interferingly bypass a circumferentially extending groove and/or bead. For example, as depicted in FIG. 6B, the closure 20B may have inbound lugs or other interference structures 208 may be sized to slide over a bead formed on the exterior of the pipe. Alternatively, the lugs or other interference structure 208 may fit into an alignment groove formed in the pipe to secure the closure thereto.

Figure 6A:
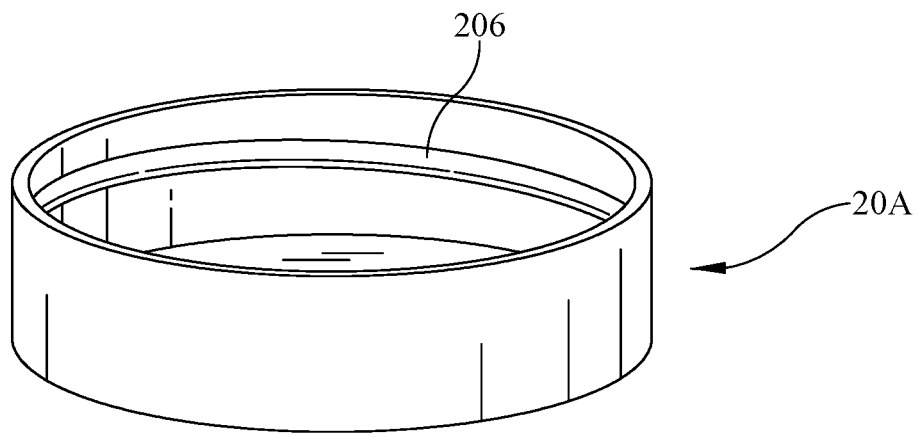
FIGS. 6A and 6B are alternative cap implementations for the cap of FIG. 1.
Figure 6B:
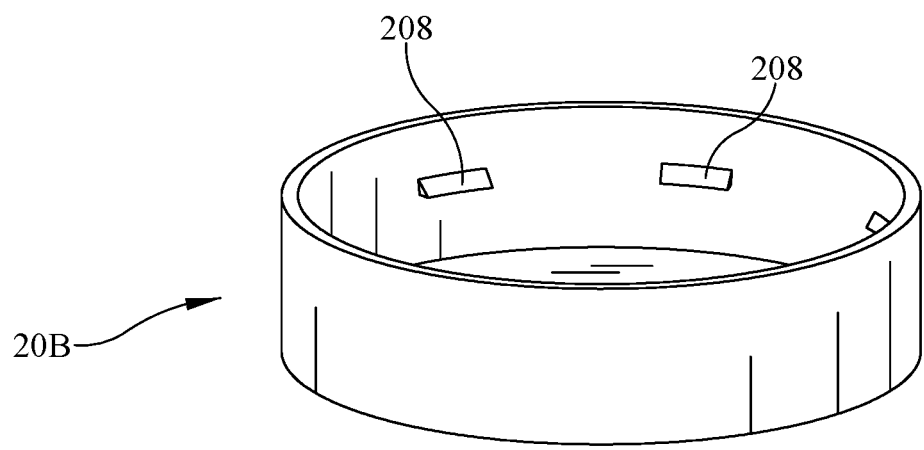

In other aspects and embodiments, the closure 20A, as depicted in FIG. 6A, may have a helically extending thread 206 extending around the interior side wall of the closure which can matingly engage a thread on the sidewall of the pipe.

Figure 7:
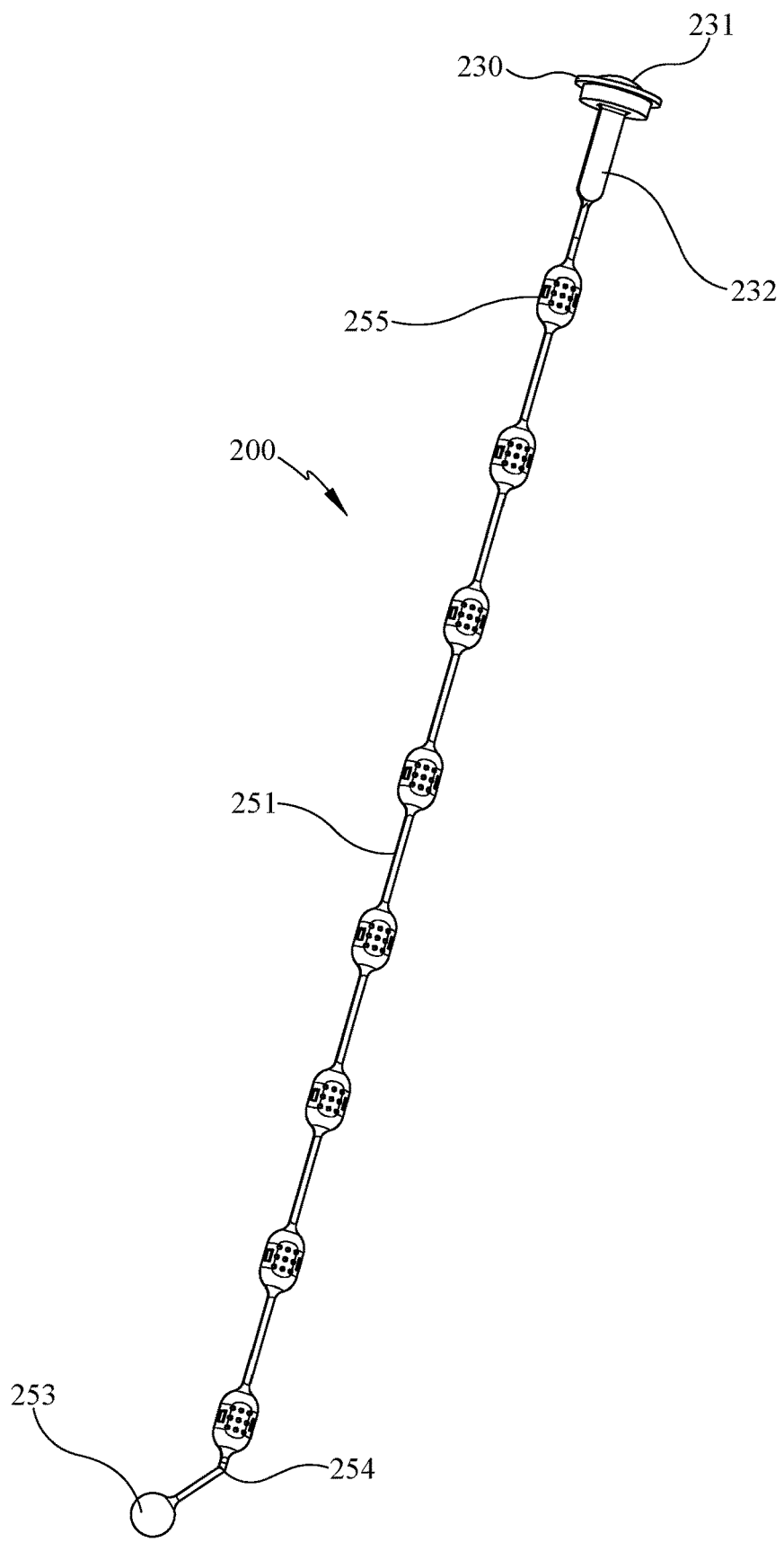
FIG. 7 illustrates an additional example of a chemical delivery strand of material for use herein.

Further implementations may be provided in addition or in place of the variations described herein. As depicted in FIG. 7, the chemical delivery system 200 is provided with a strand 251 of plastic material. Of course, the material can alternatively be a more solid material and may be, in addition or combination therewith, an HDPE or any other semi-soft injection molded plastic which retains flexibility thereof. Such material may similarly be used in any of the variations and individual elements and features disclosed including those of FIGS. 1-5. In such embodiment, baskets 255 are implemented on the strand 251 to retain the chemical material which inhibits or prevents growth within the drain line. A retention disc 230 is similarly provided and may include a turning tab 231 with step 232. Tab 231 and step 232, along with elbow 254 and a fixture, such as a ball 253 allow for more ready insertion of the delivery system 200 into the drainage pipe. Elbow 254 may be implemented as a bend in the strand 251 which provides flexion of the pliable and flexible strand allowing it to be inserted and follow along curves, turns and bends in a drainage line. Elbow 254 can be at an angle of more than or less than 90 degrees and variations in such implementation and elbow design fall within the scope hereof.

For example, in situations where the HVAC drainage line include turns or other obstructions, delivery system 200 and strand 251 may be utilized and inserted into the entry aperture of the drainage pipe. Feeding of the system 250 through the entire length of the strand/line 251 may be further enabled by the leading ball 253 as it is fed into the drainage piping. Turns or other elbows in the pipe may be negotiated by the combination of strand 251 flexibility, step 232, turning of the tab 231 and the lead ball 253 with elbow 254. Such constructions enables more ready traversal of the entirety of the delivery system 200 and placement of the baskets 255 within the drainage line.

Implementations described herein may include portions of the various embodiments not specifically shown in combination within the figures but such combination is included and captured within such disclosure. For example, aspects of the strand 251 shown in FIG. 7 may be combined with aspects of delivery system 10, 500 or aspects thereof. For example, tab 231 may be included in the retention disc 30 which may additionally, in combination or in replacement thereof implement other aspects of the system 200. For example, step 232 may be utilized in the various embodiments depicted with or without inclusion of the other features as well as ball, 253, elbow 254 and baskets 255. Each such feature, where implemented, is not required to be implemented in the direct combination disclosed in the examples depicted.

Figure 3:
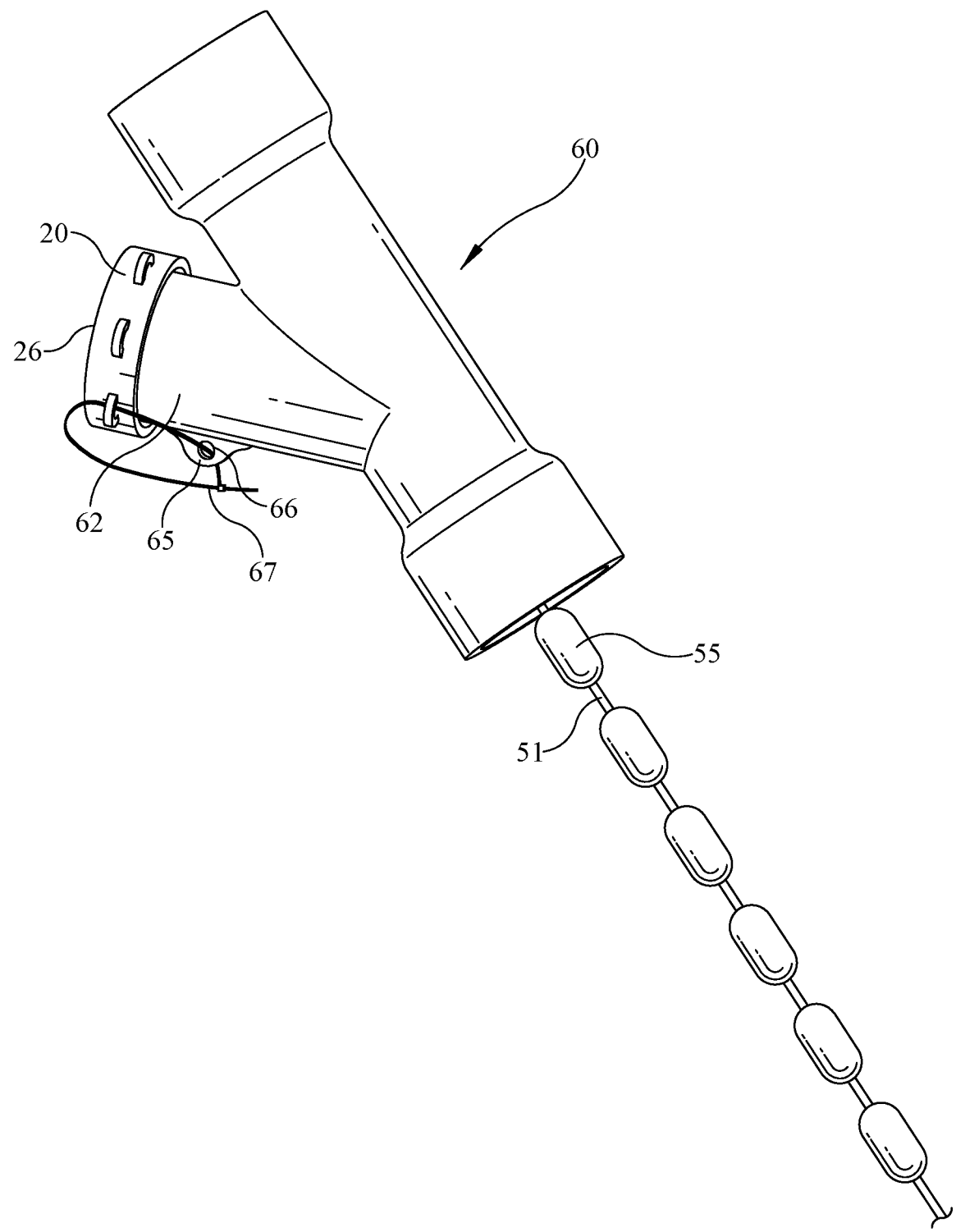
FIG. 3 illustrates a Y-connect drain pipe into which the strand of material of FIG. 1 can be inserted into one of two entry apertures and wherein the strand can extend down into the pipe.
Figure 4:
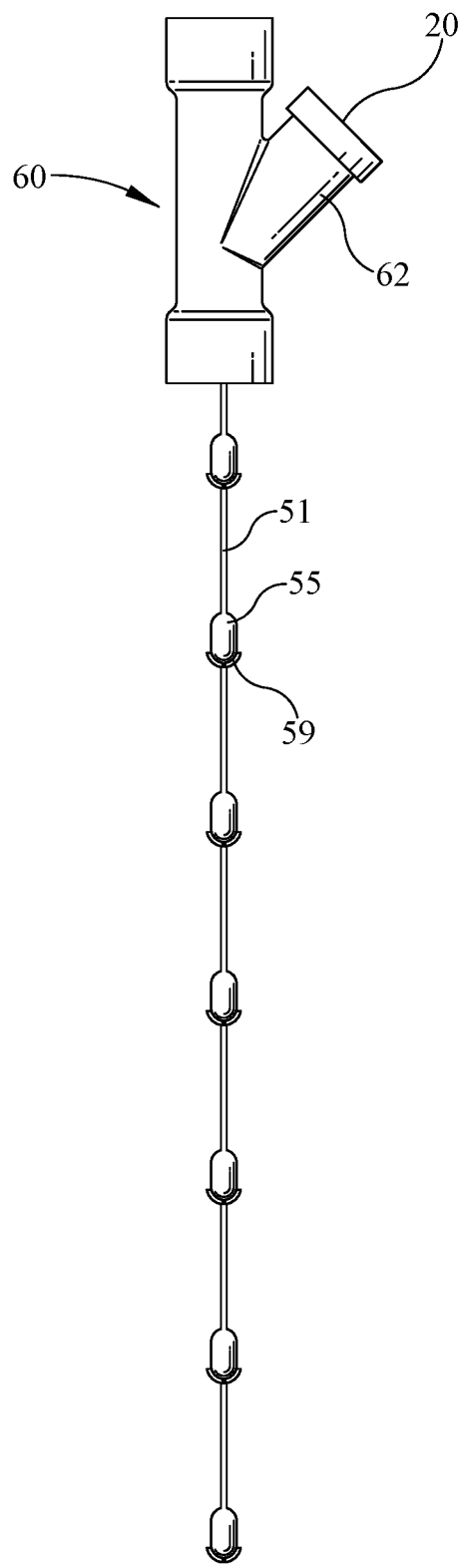
FIGS. 4 and 5 is side view of a secondary retention structure and strand of material for chemical delivery into the drainage pipe.
Figure 5:
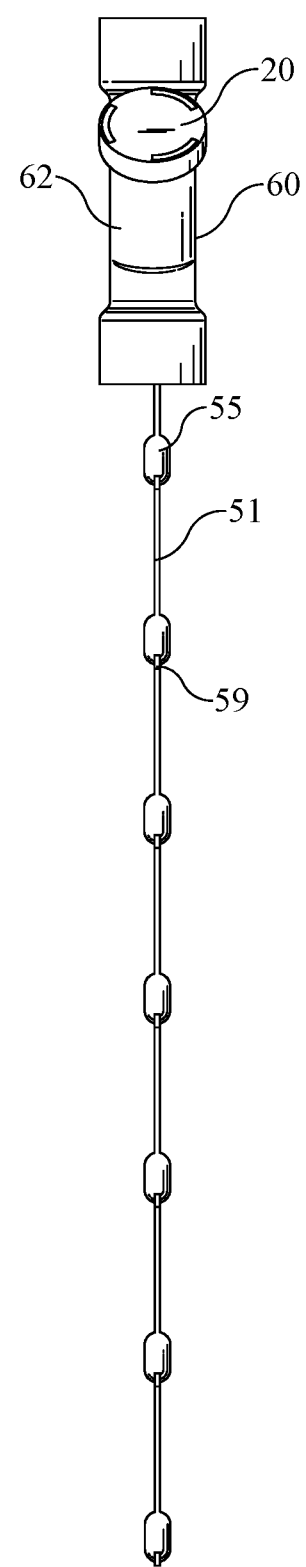

In aspects, the closure 20 can have formed thereon a plurality of securing loops 26 formed along the periphery of the side wall 24 to secure the closure to the pipe by locking tab 65 and aperture 66. For example, in embodiments, a secured zip-tie 67, as depicted in FIG. 3, or other structure may be inserted through a loop 26 and also through the aperture 66 thereby preventing removal of the closure 20 without destruction of the zip-tie 67 or other structure extending through the apertures. Thus, upon removal of the chemical delivery strand 50, the zip-tie 67 must be cut or otherwise visibly deformed or broken to remove cap from the entry pipe 62. Thus, corresponding helical threads or snap beads can be implemented such that rotation or removal of the closure 20 is inhibited or prevented without removal of the zip-tie. For example, in one embodiment, the threads may require rotation farther than allowed by the zip tie. Alternatively, multiple ties or securing structures can be used with one or more locking tabs thereby preventing removal.

In implementations, the entire chemical delivery system may be installed using the closure/cap 20, retention disc 30 and attached chemical delivery strand 50. In implementations, installation alternatively or additionally may require a Y-connect drain pipe portion 60 to be interposed into the drain line of the HVAC or other drainage pipe. When replacing the chemical delivery strand of material 50, the closure 20 is removed from the entry pipe after removal or cutting of the zip-ties or other structure. Disc 30 with the attached strand 50 may be then pulled from the drainage pipe and a new chemical delivery strand 50 may be inserted into the drainage pipe and secured therein by the retention disc 30 and closure 20.

The chemical delivery system disclosed may be incorporated into an air conditioning unit drainage line as is shown in FIGS. 8-12. As depicted in the various implementations, the drain line system 100 may incorporate aspects of the chemical delivery system described in whole or, in other implementations, in part. For example, a drainage system may incorporate aspects of the connector pipe 60 retaining a flexible chemical delivery strand 50. The drainage system may include features such as, for example, an exit drain pipe 114 from the air handling unit where moisture may condense during the air cooling process. Drain pipe 114 extends to a connector pipe 60 to allow for entry and retention of the strand 50. In various installations, however, drain line system may also include various turns in the line, such as at elbow 110, allowing for water to be redirected to a more direct flow path at a water collection site or drain. An elbow, such as elbow 110 may be required to provide a turn or bend in the direction of condensation water flow of anywhere from about 40 degrees or less up to about 90 degrees or more Such redirection or the water line drainage may be required due to obstructions or positions in a drain or other eventual receptacle of the condensation fluid. The drain line system may also utilize, in aspects, an AC drain line trap 120 downstream of the chemical delivery strand.

Some installations require the AC drainage line to be redirected due to an obstruction, wall or other positional requirement. Typically these turns are implemented with an elbow of PVC or similar material wherein the elbow can be, for example, 45 or 90 degrees. Within a pipe inlet and a pipe outlet of each elbow is inserted the incoming drain line and the outgoing drain pipe. Typical drain line PVC piping will be three quarters inch with an outside diameter (OD) of 1.050 inch (26.67 mm) and about 0.824 inch inner diameter (ID) with a wall thickness of about 0.113 inch. Other OD and ID measurements are known depending on the pipe size. Elbows are typically sized to tightly receive the OD of the associated PVC pipe and so their ID is wide enough to receive the OD of the incoming PVC pipe. Where the PVC drainage pipe enters the elbow, uneven diameter between the inner diameter wall of the elbow and the outer diameter wall of the received PVC pipe can provide uneven areas where water can pool within the drain line. Such water pooling at these joint locations encourage the formation of algae and other bacteria within the pipe leading to blockages thereof.

Figure 8:
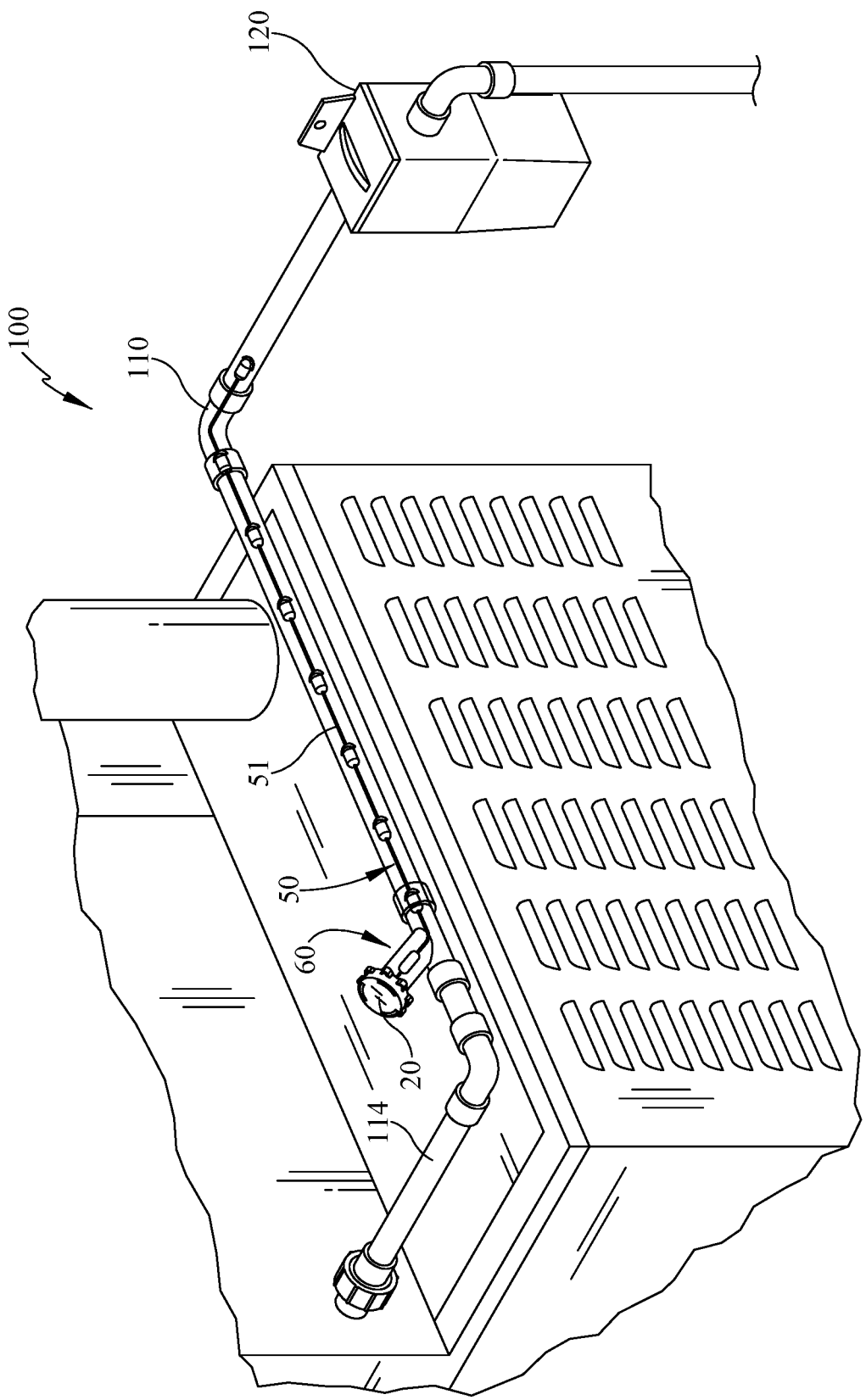
FIG. 8 illustrates the air conditioning (AC) drain line system described herein which may utilized the chemical delivery system of FIG. 1.

As shown in FIG. 8, aspects of one implementation of the drain line system may include a connector pipe 60 which allows for the insertion of the strand of material. However, as is shown, at times the strand 50 must extend through the pipe 114 a length which may include at least a portion of an elbow 110 where a turn in the drain pipe is implemented. The uneven diameter between the inner diameter wall of the elbow and the outer diameter wall of the received PVC pipe can also inhibit the passage of the flexible strand 50 containing the tablets 55.

In implementations of the drain line system 100 described herein, the elbow 110 may have a pipe receiving inlet 106a and a pipe receiving outlet 106b in order to connect the elbow to the drain pipe 114. The pipe receiving inlet and outlet 106a/106b may be formed interior of a collar 108 and each have an annular recessed edge 109 which abuts the end face of the drain pipe 114 that is inserted therein. The annular recessed edge 109 may be sized to prevent water pooling at the juncture of the two structures, where the drain pipe 114 ends within the elbow. For example, in some implementations, the elbow is constructed to have a pipe receiving inlet 106a with an annular face 109. The inner diameter of the pipe receiving inlet 106a and of the outlet 106b, shown in FIG. 11 as d3, may be sized roughly equivalent to or just barely larger than the outer diameter of the standard PVC three quarter inch pipe. For example, the inner diameter of the pipe receiving inlet and the pipe receiving outlet may be 1.056 for receiving a standard three quarter inch PVC pipe having a typical OD of 1.050 inch. Similarly the width of the annular face of the recessed edge 109 may be roughly equal to the wall thickness of the PVC pipe. For example, the width of the annular surface 109 may be substantially equal to the wall thickness of three quarter inch PVC pipe (schedule 80) of about 0.154 inch.

As a result of such design implementations, a substantially smooth surface through the flow channel 107 of the elbow and at the junctions of the inlet pipe, elbow and outlet pipe is exhibited. For example, little or no elevation or width difference will be exhibited at the junction points of the PVC drainage pipe 114 and the flow channel 107 of the elbow. These junction points where the drainage pipe 114 abuts the recessed edges 109 at both the pipe receiving inlet 106a and pipe receiving outlet 106b are susceptible to water pooling and obstructions due to uneven surface widths.

Figure 11:
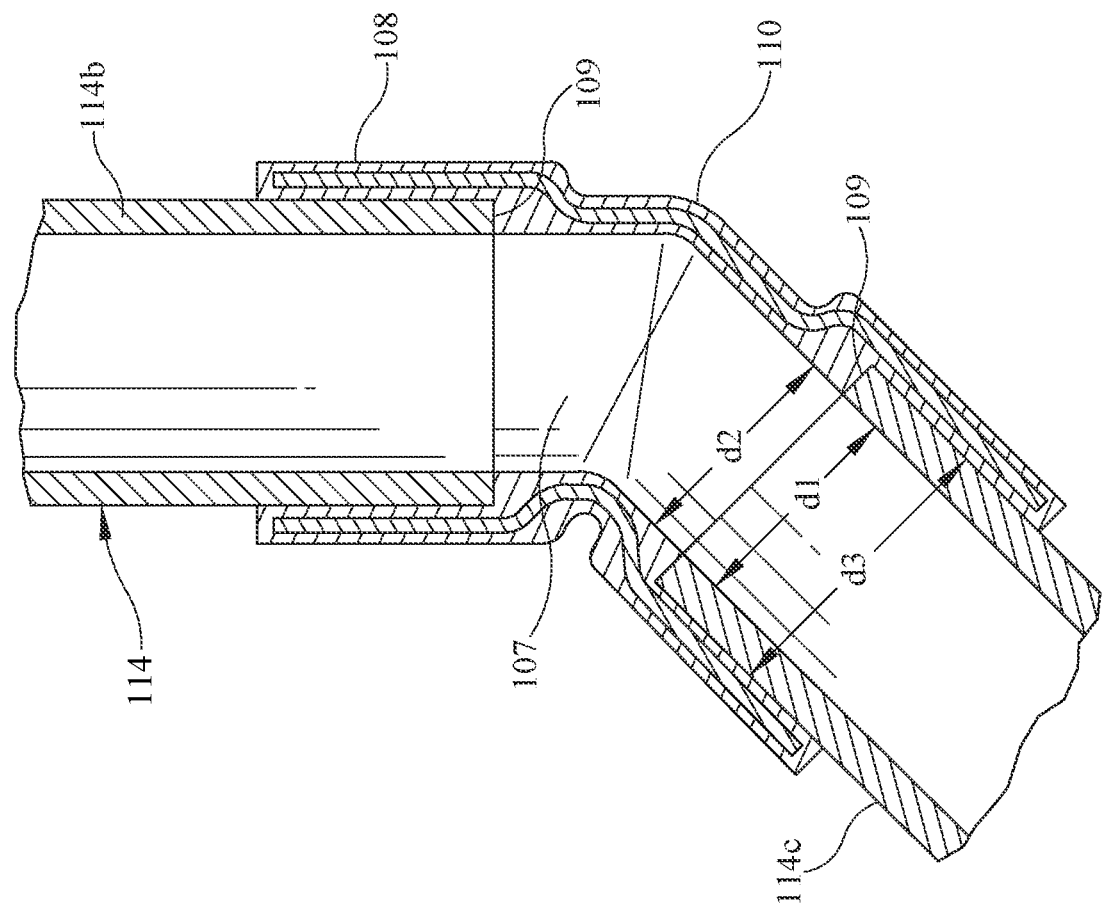
FIG. 11 sets forth a side sectional view of an exemplary elbow for use in the drain line system of FIG. 8.

As depicted in FIG. 11, in examples, the inner diameter of the AC unit PVC drainage pipe 114 may have diameter of d1 and the inner diameter of the flow channel 107 of the elbow directly adjacent to the flow pipe 114, for example at the location of the annular surface 109, may be d2. Both d1 and d2 may, in implementations, be about equal to prevent pooling of water and/or allow for the passage of the chemical delivery strand 51 once it is inserted into the drainage pipe. Generally equal approximation of d1 and d2 allows for slight variations in the diameter measurements while still accomplishing one or both of the features noted. For example, slight variations in the diameters d1 and d2 may allow for passage of the strand 51 as it is fed through the pipe while permitting minor accumulation of water at these junctions. The implementation shown ensures that the inner diameter of the first drain pipe 114b substantially matches the inner diameter of the first annular recessed edge 109 at the first inlet 106a and the inner diameter of the second drain pipe 114c substantially matches the inner diameter of the second annular recessed edge at the second inlet 106b.

Many known standard pipe sizes and constructions may be integrated with the elbow designs set forth herein. For example, variation in pipe ID and OD may be accommo-
dated depending on schedule size, whether Schedule 40 or 80, and or pipe size, from ½ inch, ¾ inch or above. For example, in each variation, adjustments to the variations in d1 may be matched with formed d2 elbow flow channel entry diameters at the junction of the elbow and the drainage pipe, in order to provide a smooth flow channel allowing water to easily travel there through while also allowing for the passage of the chemical delivery strand.

Figure 10:
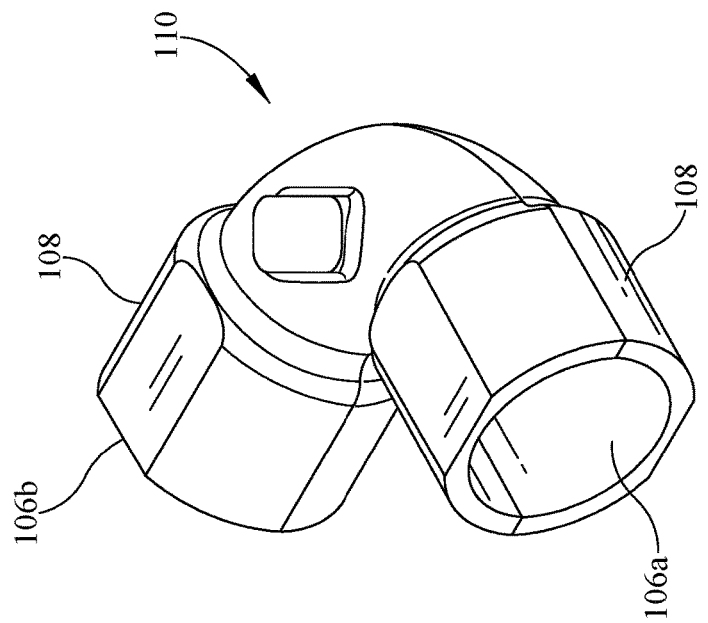
FIG. 9 and FIG. 10 set forth examples of the elbow for use in the drain line system of FIG. 8.
Figure 9:
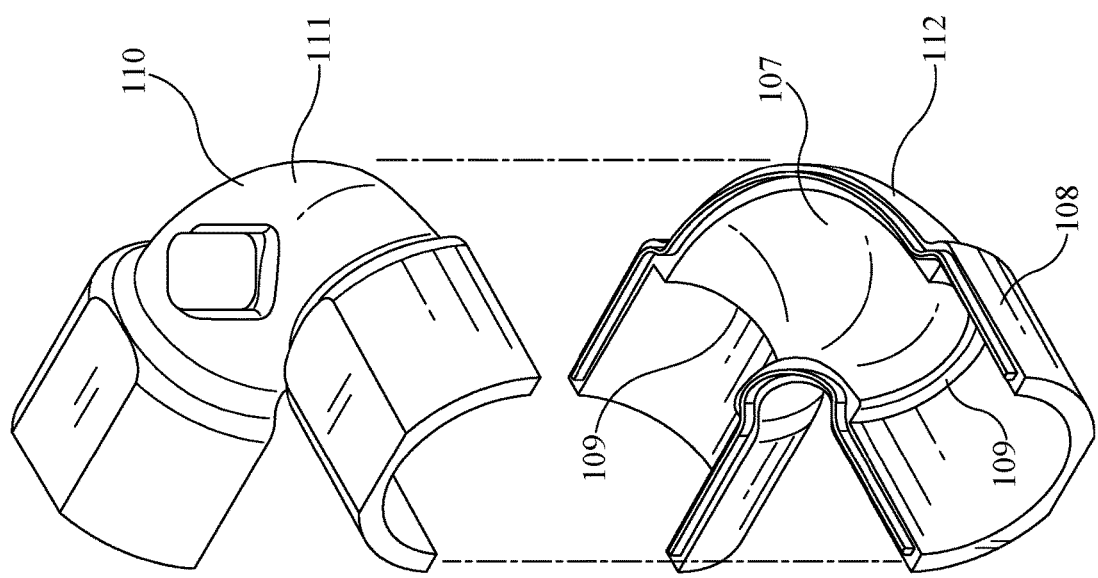

FIGS. 9-10 detail exemplary construction of the elbow 110. The elbow may be constructed in two halves for ease of molding. For example, a first elbow half 111 and a second elbow half 112 may be molded separately and then joined together to form an integrated elbow 110. Joinder of the two halves may be accomplished through known techniques such as sonic welding, adhesion or other methods. Recessed surface 109 is shown providing a flat and even surface to receive the abutting end face of the drain pipe 114, depicted in FIG. 11. Other techniques for forming the elbow may be implemented in order to create the integrated elbow 110 and the explanation of molding described herein is not deemed limiting and is only provided for explanatory purposes. For example, some constructions of the elbow for use in the drainage system hereof may include integrated molding of the entire elbow 110 with an adjacent entry and exit drainage pipe.

Figure 12:
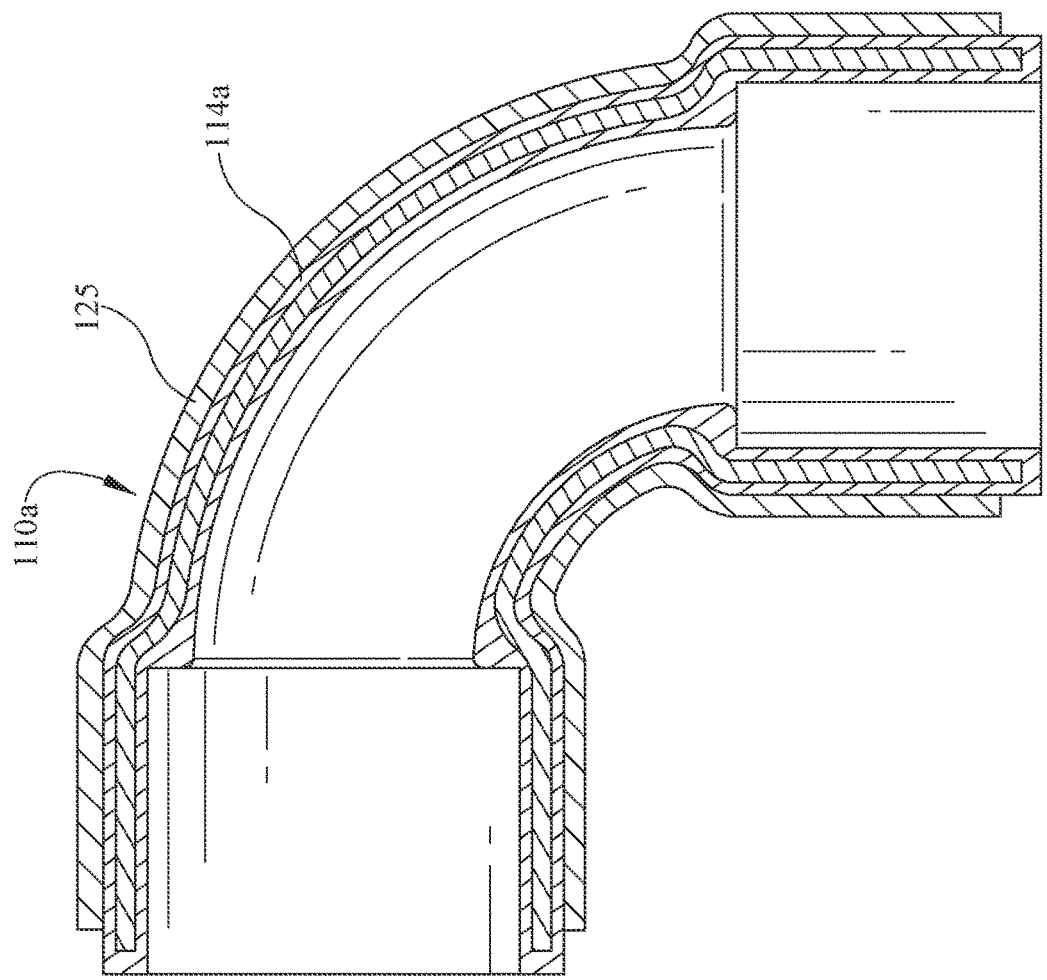
FIG. 12 discloses an alternative embodiment of the elbow for use in the drain line system hereof.

In variations, as depicted in FIG. 12, an over-molding operation may be completed after formation of the underlying molding and/or joining step of the halves for the elbow. Such over-molding may be accomplished for insulation properties or other desirable characteristics. All or a portion of the elbow 110a may include a second outer layer of material 125. For example, an underlying elbow 110 may include a first inner layer 114a which may be over-molded with an HDLPE jacket 125, as shown in FIG. 12, to create an insulated version of the elbow 110a. The underlying elbow may, for example, be constructed of PVC or ABS, while the exterior jacket 125 may be formed of a secondary material such as HDLPE or HDPE or similar resins. An insulation jacket may be necessary to maintain temperature regulation within the drainage pipe since it typically provides access into the HVAC equipment and may carry airflow from the interior of the HVAC unit.

In some implementations of the drainage system, prevention of air flow through the drainage pipe may be desirable. For example, a trap or other system may be provided to prevent direct airflow from the drain into the interior of the HVAC unit. As depicted in FIG. 8, an AC Drain trap 120 may be integrated within the drain line system 100 wherein airflow may be interrupted preventing direct air communication through the drain line and into the HVAC unit. Drain traps can be constructed using fluid offset chambers to prevent direct airflow from one chamber or side of the trap to the other by having a first entry and a second entry into the trap, where the entries are maintained at different elevations.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A drain line system, comprising:
   an AC drain line exiting an air handling unit, the drain line including at least one elbow;
   a connector pipe in the AC drain line retaining a chemical delivery strand, the chemical delivery strand extending along at least a portion of the AC drain line;
   the at least one elbow having a pipe receiving inlet and a pipe receiving outlet, the pipe receiving inlet having a first annular recessed edge and the pipe receiving outlet having a second annular recessed edge;
   a first drain pipe extending into the pipe receiving inlet and a second drain pipe extending into the pipe receiving outlet;
   wherein the first drain pipe abuts the first annular recessed edge and the second drain pipe abuts the second annular recessed edge;
   wherein an inner diameter of the first drain pipe substantially-matches an inner diameter of the first annular recessed edge, and wherein an inner diameter of the second drain pipe substantially-matches an inner diameter of the second annular recessed edge;
   the chemical delivery strand extending at least partially through the at least one elbow;
   and wherein the chemical delivery strand includes a plurality of spaced tablets dispersed along the chemical delivery strand.

2. The drain line system of claim 1 wherein the chemical delivery strand has a plurality of chemical tablets along the chemical delivery strand which are prevented from translation along the chemical delivery strand.

3. The drain line system of claim 1 the at least one elbow has a bend of between 40 degrees and 95 degrees.

4. The drain line system of claim 1 wherein the connector pipe is a Y-shaped connector pipe allowing the chemical delivery strand to be retained in the AC drain line.

5. The drain line system of claim 1 wherein the at least one elbow is a two piece elbow.

6. The drain line system of claim 5 wherein the two piece elbow includes a first elbow half and a second elbow half, each of the first elbow half and the second elbow half extending the length of the elbow.

7. The drain line system of claim 1 wherein the elbow has a first inner layer and a second outer layer of molded material.

8. The drain line system of claim 7 wherein the second outer layer of molded material is an insulation based thermoplastic.

9. The drain line system of claim 1 wherein the chemical delivery strand is flexible and extends past the at least one elbow from the connector pipe.

10. The drain line system of claim 1 wherein the first drain pipe, the at least one elbow and the second drain pipe form a smooth flow channel allowing fluid to drain without collection at the at least one elbow.

11. A drain line system, comprising:
    a drain line including an elbow;
    a chemical delivery strand extending along at least a portion of the drain line and along at least a portion of the elbow;
    the elbow having a pipe receiving inlet and a pipe receiving outlet, the pipe receiving inlet having a first annular recessed edge and the pipe receiving outlet having a second annular recessed edge;
    a first drain pipe extending into the pipe receiving inlet and a second drain pipe extending into the pipe receiving outlet;
    wherein the first drain pipe abuts the first annular recessed edge and the second drain pipe abuts the second annular recessed edge; and,
    wherein an inner diameter of the first drain pipe substantially matches an inner diameter of the first annular recessed edge, and wherein an inner diameter of the second drain pipe substantially matches an inner diameter of the second annular recessed edge;
    and wherein the chemical delivery strand includes a plurality of spaced tablets dispersed along the chemical delivery strand and which are prevented from translation along the chemical delivery strand.

12. The drain line system of claim 11 wherein the chemical delivery strand is retained at a connector pipe in the drain line, the connector pipe having an entry pipe retaining the chemical delivery strand.

13. The drain line system of claim 11 wherein the elbow has a first inner layer and a second outer layer of injection molded material.

14. The drain line system of claim 13 wherein the second outer layer of injection molded material is a thermal insulator.

15. The drain line system of claim 11 wherein the first drain pipe, the elbow and the second drain pipe form a smooth flow channel allowing fluid to drain without obstruction within the flow channel.

16. The drain line system of claim 11 wherein the chemical delivery strand extends through the elbow and into at least a portion of the second drain pipe.

17. The drain line system of claim 11 wherein the chemical delivery strand is flexible.

18. A drain line system for an air conditioning unit drainage line, comprising:
    an AC drain line including a first drain pipe, a second drain pipe and an elbow;
    a chemical delivery strand entering the AC drain line at a pipe entry location and extending along at least a portion of the AC drain line and along at least a portion of the elbow;
    the elbow having a pipe receiving inlet and a pipe receiving outlet, the pipe receiving inlet having a first annular recessed edge and the pipe receiving outlet having a second annular recessed edge;
    the first drain pipe of the AC drain line extending into the pipe receiving inlet and the second drain pipe of the AC drain line extending into the pipe receiving outlet;
    wherein the first drain pipe abuts the first annular recessed edge of the elbow and the second drain pipe abuts the second annular recessed edge of the elbow; and
    wherein an inner diameter of the first drain pipe and an inner diameter of the second drain pipe substantially matches an inner diameter of a flow through channel at least at an area directly adjacent to a joinder of both the first drain pipe and the first annular recessed edge and the second drain pipe and the second annular recessed edge;

and wherein the chemical delivery strand includes a plurality of spaced tablets dispersed along the chemical delivery strand.

\* \* \* \* \*